United States Patent
Nam et al.

(10) Patent No.: US 11,758,567 B2
(45) Date of Patent: Sep. 12, 2023

(54) DYNAMIC USER EQUIPMENT PARAMETER ADAPTATION STATUS REPORT

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/247,113

(22) Filed: Nov. 30, 2020

(65) Prior Publication Data

US 2021/0176761 A1 Jun. 10, 2021

Related U.S. Application Data

(60) Provisional application No. 62/945,541, filed on Dec. 9, 2019.

(51) Int. Cl.
*H04W 72/00* (2023.01)
*H04W 72/53* (2023.01)
*H04W 72/21* (2023.01)
*H04W 72/23* (2023.01)
*H04W 72/50* (2023.01)

(52) U.S. Cl.
CPC ........... *H04W 72/53* (2023.01); *H04W 72/21* (2023.01); *H04W 72/23* (2023.01); *H04W 72/535* (2023.01)

(58) Field of Classification Search
None
See application file for complete search history.

(56) References Cited

U.S. PATENT DOCUMENTS

| 2014/0036747 A1* | 2/2014 | Nory ................. H04W 72/0406 370/336 |
| 2018/0227094 A1* | 8/2018 | Liu ...................... H04W 72/046 |
| 2019/0254056 A1* | 8/2019 | Salah ................ H04W 72/0446 |
| 2021/0014010 A1* | 1/2021 | Babaei ................. H04L 1/1642 |
| 2021/0029655 A1* | 1/2021 | Lindoff ................ H04W 72/23 |

(Continued)

FOREIGN PATENT DOCUMENTS

| WO | WO-2015078771 A1 * | 6/2015 | ............ H04W 24/02 |
| WO | WO-2020133203 A1 * | 7/2020 | |

OTHER PUBLICATIONS

CMCC: "Discussion on PDCCH-Based Power Saving Signal/Channel Design" 3GPP Draft, 3GPP TSG RAN WG1 #97, R1-1906524, 3rd Generation Partnership Project (3GPP), Mobile Competence Centre, 650, Route Des Lucioles, F-06921, Sophia-Antipolis Cedex, France, vol. RAN WG1. No. Reno, USA; May 13, 2019-May 17, 2019, May 13, 2019 (May 13, 2019), XP051727974, 10 pages, Retrieved from the Internet: URL: http://www.3gpp.org/ftp/Meetings%5F3GPP%5FSYNC/RAN1/Docs/R1%2D1906524%2Ezip [retrieved on May 13, 2019] section 2.

(Continued)

*Primary Examiner* — Kodzovi Acolatse
(74) *Attorney, Agent, or Firm* — Harrity & Harrity, LLP

(57) ABSTRACT

Various aspects of the present disclosure generally relate to wireless communication. In some aspects, a user equipment (UE) may receive an indication to transmit a dynamic UE parameter adaptation report to a base station (BS). The UE may transmit the dynamic UE parameter adaptation report to the BS based at least in part on receiving the indication. Numerous other aspects are provided.

27 Claims, 8 Drawing Sheets

300 →

(56) References Cited

U.S. PATENT DOCUMENTS

2021/0212114 A1\* 7/2021 Chen ................. H04W 74/0816
2022/0217707 A1\* 7/2022 Zhou ..................... H04L 5/0096

OTHER PUBLICATIONS

CMCC: "Discussion on Power Saving Signal Triggering UE Adaptation", 3GPP Draft, 3GPP TSG RAN WG1 #96bis, R1-1904738, 3rd Generation Partnership Project (3GPP), Mobile Competence Centre, 650, Route Des Lucioles, F-06921, Sophia-Antipolis Cedex, France, vol. RAN WG1. no. Xi 'an. China; Apr. 8, 2019-Apr. 12, 2019, Apr. 2, 2019 (Apr,. 2, 2019), XP051707299, 7 pages, Retrieved from the Internet; URL: http://www.3gpp.org/ftp/tsg%5Fran/WG1%6FRL1/TSGR1%5F96b/Docs/R1%2D1904738%2Ezip [retrieved on Apr. 2, 2019], paragraph [02.2], figures 1. 2, section 2; section 3.
Intel Corporation: "UE Adaptation to the Traffic and UE Power Consumption Characterstics," Draft, 3GPP TSG RAN WG1 Meeting #95, R1-1812513, Intel—UE Adaptation To Traffic-Final, 3rd Generation Partnership Project (3GPP), Mobile Competence Centre, 650, Route Des Lucioles, F-06921, Sophia-Antipolis Cedex, France, vol. RAN WG1. No. Spokane. USA, Nov. 12, 2018-Nov. 16, 2018, Nov. 11, 2018 (Nov. 11, 2018), XP051554457, pp. 1-12, Retrieved from the Internet: URL: http://www.3gpp.org/ftp/Meetings%5F3GPP%5FSYNC/RAN1/Docs/R1%2D1906524%2Ezip retrieved on [Nov. 11, 2018] section 2.
International Search Report and Written Opinion—PCT/US2020/062735—ISA/EPO—dated Mar. 4, 2021.
LG Electronics: "Discussions on Triggering Adaptation for UE Power Consumption," 3GPP Draft, 3GPP TSG RAN WG1 Meeting #95, R1-1812588, Discussions on Triggering Adaptation for UE Power Consumption, 3rd Generation Partnership Project (3GPP), Mobile Competence Centre, 650, Route Des Lucioles, F-06921, Sophia-Antipolis Cedex, France, vol. RAN WG1. No. Spokane, USA, Nov. 12, 2018- Nov. 16, 2018, Nov. 11, 2018 (Nov. 11, 2018), XP051554532 pp. 1-7, Retrieved from the Internet URL: http://www.3gpp.org/ftp/Meetings%5F3GPP%5FSYNC/RAN1/Docs/R1%2D1813621%2Ezip retrieved on [Nov. 11, 2018] section 2, section 3, section 3, section 4.
Nokia, et al., "Dormancy," 3GPP Draft, 3GPP TSG-RAN WG2 Meeting #107bis, R2-1912992, Dormancy in RAN2, 3rd Generation Partnership Project (3GPP), Mobile Competence Centre, 650, Route Des Lucioles, F-06921, Sophia-Antipolis Cedex, France, vol. RAN WG2. No. Chongqing, China; Oct. 14, 2019-Oct. 18, 2019, Oct. 4, 2019 (Oct. 4, 2019), XP051804778, 4 pages, Retrieved from the Internet URL: https://ftp.3gpp.org/tsg_ran/WG2_RL2/TSGR2_107/bis/Docs/R2-1912992.zip R2-1912992 Dormancy in RAN2.docx [retrieved on Oct. 4, 2019] section 2 section 3.
Nokia, et al., "On UE Power Saving Triggering Mechanisms," 3GPP Draft, 3GPP TSG RAN WG1 Meeting #95, R1-1813621, 3rd Generation Partnership Project (3GPP), Mobile Competence Centre, 650, Route Des Lucioles, F-06921, Sophia-Antipolis Cedex, France, vol. RAN WG1. No. Spokane, US, Nov. 12, 2018-Nov. 16, 2018, (Nov. 11, 2018), XP051555679, 7 pages, Retrieved from the Internet: URL: http://www.3gpp.org/ftp/Meetings%5F3GPP%5FSYNC/RAN1/Docs/R1%2D1813621%2Ezip [retrieved on Nov. 11, 2018] section 2.1.

\* cited by examiner

DYNAMIC USER EQUIPMENT PARAMETER ADAPTATION STATUS REPORT

CROSS-REFERENCE TO RELATED APPLICATION

This patent application claims priority to U.S. Provisional Patent Application No. 62/945,541, filed on Dec. 9, 2019, entitled "DYNAMIC USER EQUIPMENT PARAMETER ADAPTATION STATUS REPORT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for a dynamic user equipment parameter adaptation status report.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication to transmit a dynamic UE parameter adaptation report to a base station (BS); and transmitting the dynamic UE parameter adaptation report to the BS based at least in part on receiving the indication.

In some aspects, a method of wireless communication, performed by a BS may include transmitting, to a UE, an indication to transmit a dynamic UE parameter adaptation report; and receiving, from the UE, the dynamic UE parameter adaptation report based at least in part on transmitting the indication.

In some aspects, a UE for wireless communication may include memory and one or more processors operatively coupled to the memory. The memory and the one or more processors may be configured to receive an indication to transmit a dynamic UE parameter adaptation report to a BS; and transmit the dynamic UE parameter adaptation report to the BS based at least in part on receiving the indication.

In some aspects, a BS for wireless communication may include memory and one or more processors operatively coupled to the memory. The memory and the one or more processors may be configured to transmit, to a UE, an indication to transmit a dynamic UE parameter adaptation report; and receive, from the UE, the dynamic UE parameter adaptation report based at least in part on transmitting the indication.

In some aspects, a non-transitory computer-readable medium may store one or more instructions for wireless communication. The one or more instructions, when executed by one or more processors of a UE, may cause the one or more processors to: receive an indication to transmit a dynamic UE parameter adaptation report to a BS; and transmit the dynamic UE parameter adaptation report to the BS based at least in part on receiving the indication.

In some aspects, a non-transitory computer-readable medium may store one or more instructions for wireless communication. The one or more instructions, when executed by one or more processors of a BS, may cause the one or more processors to: transmit, to a UE, an indication to transmit a dynamic UE parameter adaptation report; and receive, from the UE, the dynamic UE parameter adaptation report based at least in part on transmitting the indication.

In some aspects, an apparatus for wireless communication may include means for receiving an indication to transmit a dynamic UE parameter adaptation report to a BS; and means for transmitting the dynamic UE parameter adaptation report to the BS based at least in part on receiving the indication.

In some aspects, an apparatus for wireless communication may include means for transmitting, to a UE, an indication to transmit a dynamic UE parameter adaptation report; and means for receiving, from the UE, the dynamic UE parameter adaptation report based at least in part on transmitting the indication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
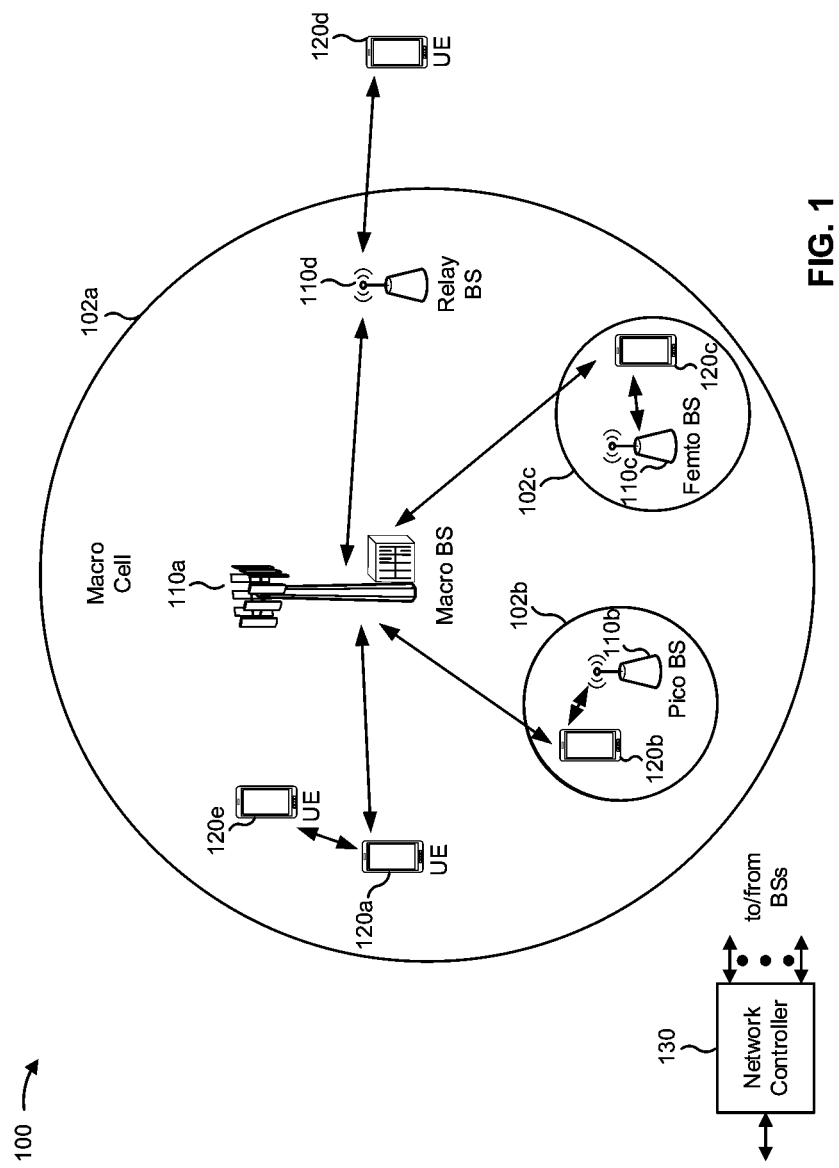
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UE) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
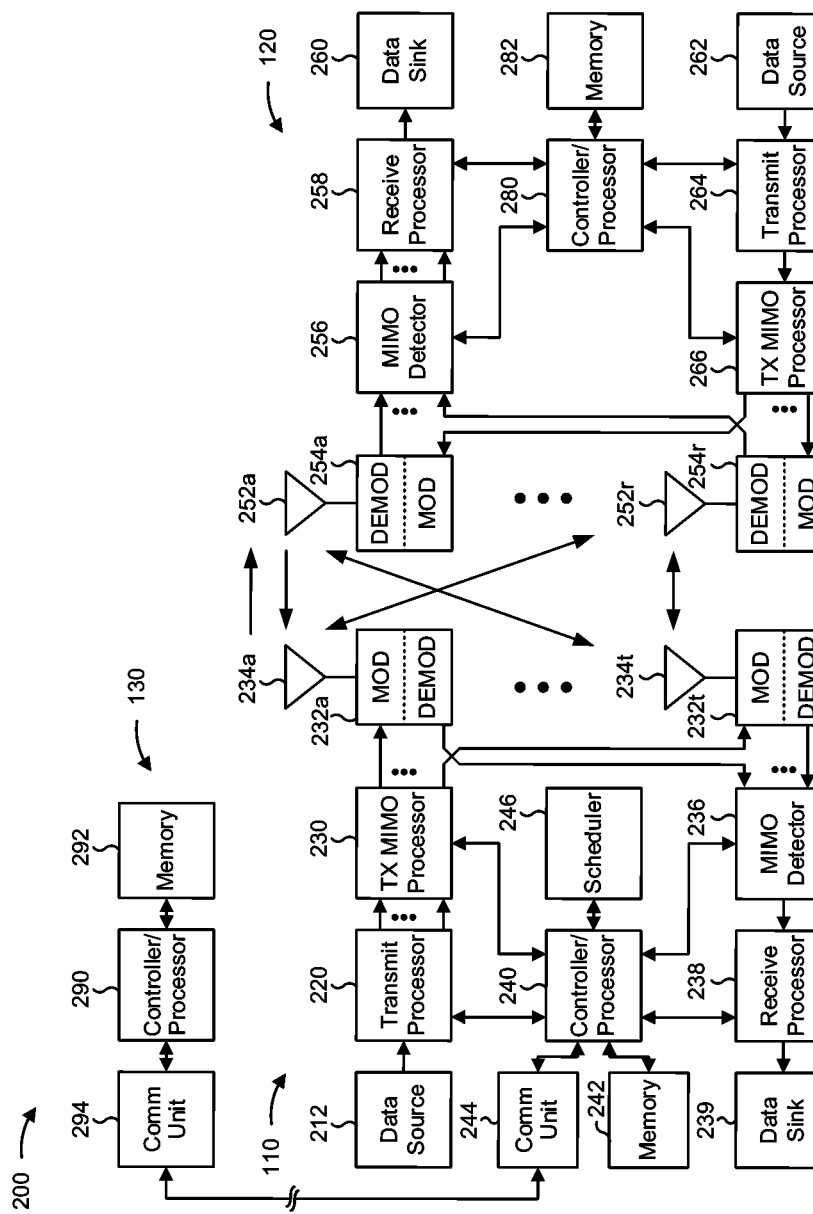
FIG. 2 is a block diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a dynamic UE parameter adaptation status report, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for receiving an indication to transmit a dynamic UE parameter adaptation report to a BS 110, means for transmitting the dynamic UE parameter adaptation report to the BS 110 based at least in part on receiving the indication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE 120, an indication to transmit a dynamic UE parameter adaptation report, means for receiving, from the UE 120, the dynamic UE parameter adaptation report based at least in part on transmitting the indication, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Dynamic UE parameter adaption is a technique that can be used to dynamically configure various UE parameters for power saving at a UE. A BS may transmit an indication of dynamic UE parameter adaptation configuration to the UE to configure the UE with one or more dynamic UE parameter adaptation parameters. The indication of the dynamic UE parameter adaptation configuration may be included in a scheduling downlink control information (DCI) communication (e.g., a DCI communication that schedules uplink resources or downlink resources for the UE) and/or a non-scheduling DCI communication (e.g., a DCI communication that includes signaling information other than resource scheduling during data traffic inactivity for the UE).

The dynamic UE parameter adaptation configuration may be indicated by a value, a field, an M-bit (e.g., one or more bits) indicator that indexes into a table or another type of data structure that identifies a plurality of dynamic UE parameter adaptation configurations. Moreover, the table or other type of data structure may identify a unique or specific combination of dynamic UE parameter adaptation parameters for each of the plurality of dynamic UE parameter adaptation configurations.

In some cases, the BS may be made aware that the UE has received and applied a dynamic UE parameter adaptation configuration by receiving hybrid automatic repeat request (HARQ) feedback from the UE. For example, the UE may receive a scheduling DCI communication identifying the dynamic UE parameter adaptation configuration, may successfully decode the scheduling DCI communication, may identify and apply the dynamic UE parameter adaptation configuration in the scheduling DCI communication, and may transmit a HARQ acknowledgement (ACK) with the dynamic UE parameter adaptation configuration applied.

In some cases, the BS may be unaware or may lose track of the status of the dynamic UE parameter adaptation configuration configured at the UE. For example, the UE may not be configured to transmit HARQ feedback for non-scheduling DCI communications. Thus, if the BS transmits a dynamic UE parameter adaptation configuration to the UE in a non-scheduling DCI communication, the BS will not receive HARQ feedback and will not know if the UE successfully decoded the non-scheduling DCI and applied the dynamic UE parameter adaptation configuration.

As another example, even though the UE may transmit a HARQ ACK for a scheduling DCI, the BS may fail to receive the HARQ ACK (e.g., due to poor link quality).

Thus, the BS may not know whether the UE received and applied the dynamic UE parameter adaptation configuration.

As another example, the BS may transmit a dynamic UE parameter adaptation configuration to the UE in a scheduling DCI communication, and the UE may successfully decode the scheduling DCI communication but may not successfully decode a physical downlink shared channel (PDSCH) communication scheduled by the scheduling DCI communication. In this case, the UE may transmit a HARQ negative ACK (NACK) to the BS. The BS may receive the NACK and may be unable to determine, based at least in part on the HARQ NACK, whether the UE failed to decode the PDSCH communication only or failed to decode both the PDSCH communication and the scheduling DCI communication. Thus, the BS may not know whether the UE received and applied the dynamic UE parameter adaptation configuration.

Some aspects described herein provide techniques and apparatuses for a dynamic UE parameter adaptation status report. A UE and a BS may synchronize the status of the dynamic UE parameter adaptation status of the UE using a dynamic UE parameter adaptation report, which may include a physical layer status report (e.g., a dynamic physical layer status report) or similar type of report. To obtain an indication of the dynamic UE parameter adaptation configuration configured at the UE at any particular time, the BS may transmit an indication to transmit the dynamic UE parameter adaptation report. The UE may receive the indication and may transmit dynamic UE parameter adaptation report, which may indicate the dynamic UE parameter adaptation configuration configured at the UE. In this way, the BS obtains the dynamic UE parameter adaptation configuration configured at the UE and is permitted to configure dynamic UE parameter adaptation updates for the UE. The dynamic UE parameter adaptation updates may be used to reduce power consumption by the UE, may be used for dynamic control of IoT devices, and may be used for dynamic control and latency reduction for ultra-reliable low-latency communication (URLLC), among other purposes.

Figure 3A:
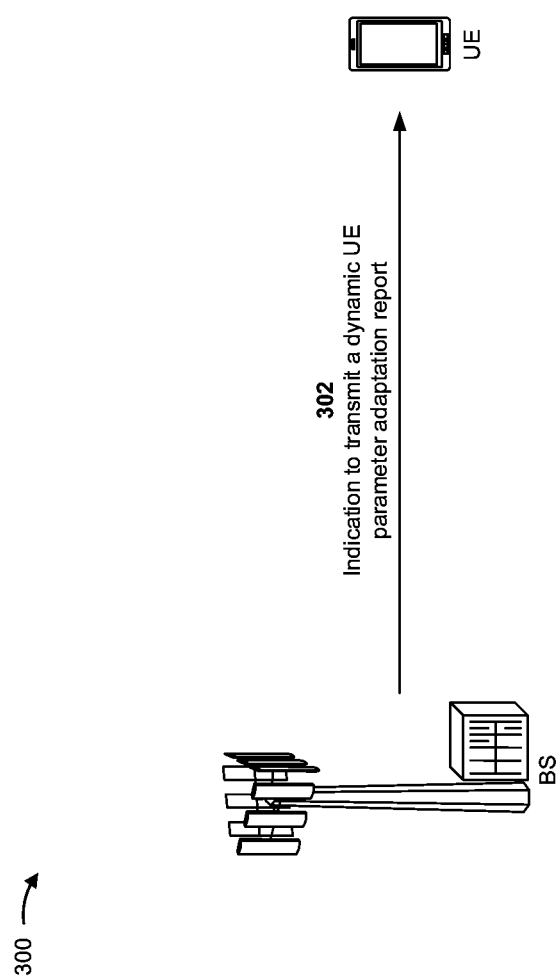
FIGS. 3A and 3B are diagrams illustrating one or more examples of a dynamic UE parameter adaptation status report, in accordance with various aspects of the present disclosure.
Figure 3B:
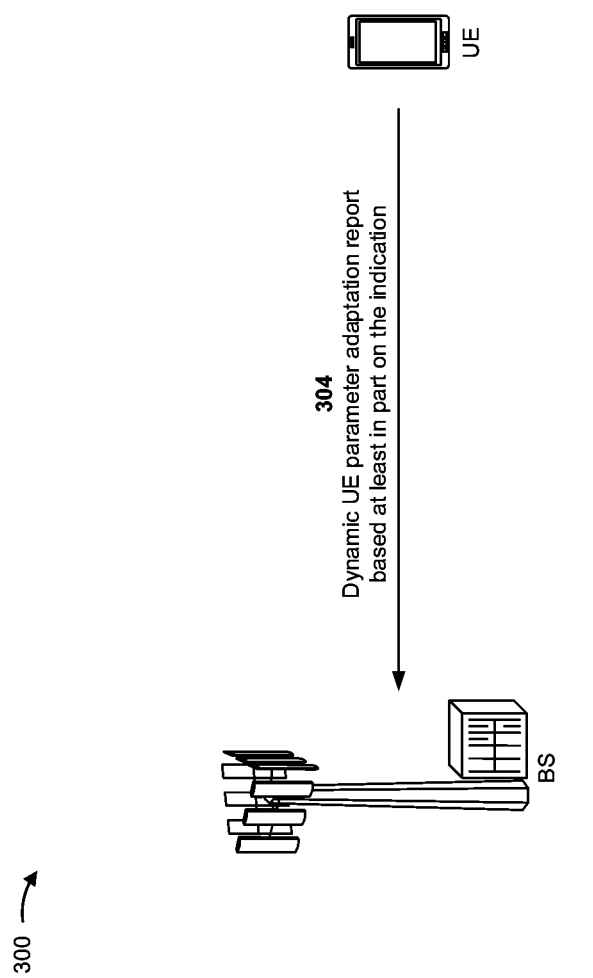

FIGS. 3A and 3B are diagrams illustrating one or more examples 300 of a dynamic UE parameter adaptation status report, in accordance with various aspects of the present disclosure. As shown in FIGS. 3A- and 3B, example(s) 300 may include communication between a UE (e.g., UE 120) and a BS (e.g., BS 110). In some aspects, the UE and the BS may be included in a wireless network such as wireless network 100. The UE and the BS may communicate on an access link, which may include an uplink and a downlink.

In some aspects, the UE may be configured with one or more dynamic UE parameter adaptation parameters for power saving purposes. For example, the BS may transmit a dynamic UE parameter adaptation configuration to the UE to configure the UE with one or more dynamic UE parameter adaptation parameters. The BS may transmit an indication of the dynamic UE parameter adaptation in a scheduling DCI communication, in a non-scheduling DCI communication, and/or the like.

In some aspects, the one or more dynamic UE parameter adaptation parameters may include a bandwidth part (BWP) switching parameter, which may be a dynamic UE parameter adaptation parameter that may be used to configure the UE to switch between a BWP having a large bandwidth to another BWP having relatively smaller bandwidth such that the UE is to monitor fewer frequency resources, which reduces power consumption of the UE. In some aspects, the one or more dynamic UE parameter adaptation parameters may include a physical downlink control channel (PDCCH) monitoring parameter, which may be a dynamic UE parameter adaptation parameter that may be used to configure the UE with a PDCCH monitoring periodicity (e.g., in slots, in symbols, and/or the like) that permits the UE to less frequently monitor for PDCCH communications, which reduces power consumption of the UE.

In some aspects, the one or more dynamic UE parameter adaptation parameters may include a PDSCH monitoring parameter, which may be a dynamic UE parameter adaptation parameter that may be used to configure the UE with a PDSCH monitoring periodicity (e.g., in slots, in symbols, and/or the like) that permits the UE to less frequently monitor for PDSCH communications, which reduces power consumption of the UE. In some aspects, the one or more dynamic UE parameter adaptation parameters may include a cross-slot scheduling parameter, which may be a dynamic UE parameter adaptation parameter that permits the UE to be scheduled using cross-slot scheduling (e.g., where a scheduling DCI is permitted to schedule a downlink communication or uplink communication in a different slot than the slot in which the scheduling DCI is transmitted), which reduces power consumption of the UE.

In some aspects, the one or more dynamic UE parameter adaptation parameters may include a MIMO layers parameter, which may be a dynamic UE parameter adaptation parameter that configures the UE to switch between a quantity of active MIMO layers. The MIMO layers parameter may be used to deactivate MIMO layers for the UE such that the UE is permitted to deactivate various radio frequency (RF) chain components, which reduces power consumption of the UE. In some aspects, the one or more dynamic UE parameter adaptation parameters may include a secondary cell (SCell) dormancy parameter, which may be a dynamic UE parameter adaptation parameter that may be used to configure the UE to deactivate an SCell of the UE such that UE is to monitor fewer cells, which reduces power consumption of the UE.

As shown in FIG. 3A, and by reference number 302, the BS may transmit, to the UE, an indication to transmit a dynamic UE parameter adaptation report so that the dynamic UE parameter adaptation status of the UE may be synchronized between the BS and the UE. The dynamic UE parameter adaptation report may include a physical layer status report (e.g., a dynamic physical layer status report). In some aspects, the BS may transmit the indication based at least in part on transmitting, to the UE, a non-scheduling DCI communication that includes an indication of a dynamic UE parameter adaptation configuration. In some aspects, the BS may transmit the indication based at least in part on receiving, from the UE, a HARQ NACK associated with a scheduling DCI communication that includes an indication of a dynamic UE parameter adaptation configuration. In some aspects, the BS may transmit the indication based at least in part on not receiving HARQ feedback for a scheduling DCI. In some aspects, the BS may transmit the indication for other purposes and at other times.

In some aspects, the BS may transmit the indication in various types of downlink communications, such as a radio resource control (RRC) communication, a medium access control control element (MAC-CE) communication, a DCI communication, and/or the like. As an example, the BS may transmit an indication to periodically or semi-persistently transmit the dynamic UE parameter adaptation report in an RRC communication or MAC-CE communication. In this case, the RRC communication or MAC-CE communication may configure the UE to transmit the dynamic UE parameter adaptation report a plurality of times in a periodic or semi-persistent manner. In some aspects, the RRC communication or MAC-CE communication may further identify one or more physical uplink control channel (PUCCH) resources (e.g., time-domain resources, frequency-domain resources, and/or the like), one or more grant free physical uplink shared channel (PUSCH) resources, and/or the like in which to periodically or semi-persistently transmit the dynamic UE parameter adaptation report.

As another example, the BS may transmit a dynamic indication to transmit an aperiodic dynamic UE parameter adaptation report (e.g., a single dynamic UE parameter adaptation report that is triggered based at least in part on the dynamic indication being received at the UE) in a DCI communication. In some aspects, DCI communication may be a new DCI type specifically configured for requesting aperiodic dynamic UE parameter adaptation reports (e.g., a dynamic UE parameter adaptation DCI communication). In some aspects, the DCI communication may be a scheduling DCI communication or non-scheduling DCI communication repurposed for requesting aperiodic dynamic UE parameter adaptation reports. As an example, a resource allocation field in a non-scheduling DCI communication may be repurposed to include the indication to transmit the aperiodic dynamic UE parameter adaptation report (e.g., because the resource allocation field may be otherwise unused in the non-scheduling DCI communication as the non-scheduling DCI communication does not schedule resources for an associated downlink or uplink communication).

In some aspects, the DCI communication may further identify one or more PUCCH resources, one or more grant free PUSCH resources, or one or more dynamically granted PUSCH resources, and/or the like in which the aperiodic dynamic UE parameter adaptation report is to be transmitted.

In some aspects, the indication to transmit the dynamic UE parameter adaptation report may further indicate the information that is to be included in the dynamic UE parameter adaptation report. For example, the indication to transmit the dynamic UE parameter adaptation report may indicate that the dynamic UE parameter adaptation report is to include an indication of the dynamic UE parameter adaptation configuration configured at the UE (e.g., the dynamic UE parameter adaptation configuration configured at the UE at the time the indication to transmit the dynamic UE parameter adaptation report is received at the UE). As another example, the indication to transmit the dynamic UE parameter adaptation report may indicate that the dynamic UE parameter adaptation report is to include an indication of the dynamic UE parameter adaptation configuration most recently received from the BS.

As another example, the indication to transmit the dynamic UE parameter adaptation report may indicate that the dynamic UE parameter adaptation report is to include an explicit indication of one or more dynamic UE parameter adaptation parameters configured at the UE. In some cases, a dynamic UE parameter adaptation parameter, such as an SCell dormancy parameter, may be time limited in that the UE is to use the SCell dormancy parameter for a particular amount of time and then switch to another SCell dormancy parameter (e.g., a default SCell dormancy parameter). Thus, as another example, the indication to transmit the dynamic UE parameter adaptation report may indicate that the dynamic UE parameter adaptation report is to include an indication of a remaining amount of time that the UE is to use a timer-based dynamic UE parameter adaptation parameter.

As another example, the indication to transmit the dynamic UE parameter adaptation report may indicate that the dynamic UE parameter adaptation report is to include one or more other types of reports piggybacked on the dynamic UE parameter adaptation report, such as a power headroom report, a buffer status report, and/or the like.

As shown in FIG. 3B, and by reference number 304, the UE may receive the indication to transmit the dynamic UE parameter adaptation report and may transmit the dynamic UE parameter adaptation based at least in part on receiving the indication. For example, the UE may periodically or semi-persistently transmit the dynamic UE parameter adaptation report to the BS based at least in part on receiving an indication to periodically or semi-persistently transmit the dynamic UE parameter adaptation report. As another example, the UE may transmit an aperiodic dynamic UE parameter adaptation report to the BS based at least in part on receiving a dynamic indication to transmit the dynamic UE parameter adaptation report.

As another example, the UE may transmit the dynamic UE parameter adaptation in the resources (e.g., PDSCH resources, PUCCH resources, and/or the like) indicated along with the indication to transmit the dynamic UE parameter adaptation report. As another example, the UE may include, in the dynamic UE parameter adaptation report, the types of information indicated by the indication to transmit the dynamic UE parameter adaptation report, such as any of the information identified above.

In this way, the UE and the BS may synchronize the status of the dynamic UE parameter adaptation status of the UE using a dynamic UE parameter adaptation report. To obtain an indication of the dynamic UE parameter adaptation configuration configured at the UE at any particular time, the BS may transmit an indication to transmit the dynamic UE parameter adaptation report. The UE may receive the indication and may transmit dynamic UE parameter adaptation report, which may indicate the dynamic UE parameter adaptation configuration configured at the UE. In this way, the BS obtains the dynamic UE parameter adaptation configuration configured at the UE and is permitted to configure dynamic UE parameter adaptation updates for the UE.

As indicated above, FIGS. 3A and 3B are provided as one or more examples. Other examples may differ from what is described with respect to FIGS. 3A and 3B.

Figure 4:
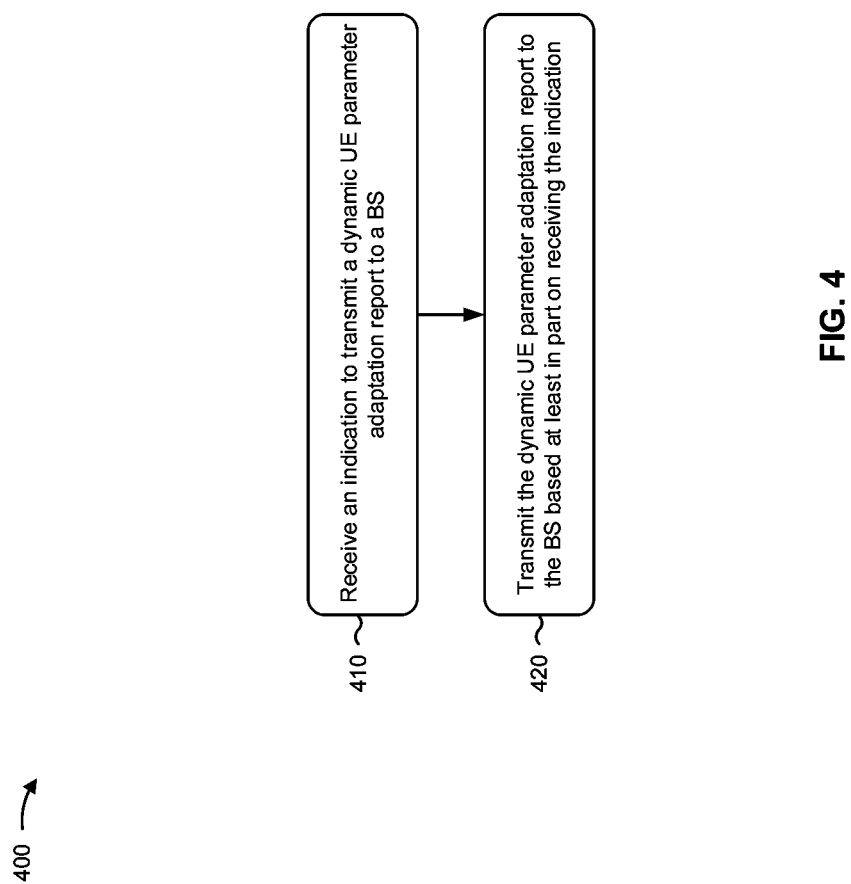
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120) performs operations associated with a dynamic user equipment parameter adaptation status report.

As shown in FIG. 4, in some aspects, process 400 may include receiving an indication to transmit a dynamic UE parameter adaptation report to a BS (block 410). For example, the UE (e.g., using receive processor 258, transmit processor 264, controller/processor 280, memory 282, and/or the like) may receive an indication to transmit a dynamic UE parameter adaptation report to a BS, as described above.

As further shown in FIG. 4, in some aspects, process 400 may include transmitting the dynamic UE parameter adaptation report to the BS based at least in part on receiving the indication (block 420). For example, the UE (e.g., using receive processor 258, transmit processor 264, controller/ processor 280, memory 282, and/or the like) may transmit the dynamic UE parameter adaptation report to the B S based at least in part on receiving the indication, as described above.

Process 400 may include additional aspects, such as any single aspect or any combination of aspects described below and/or in connection with one or more other processes described elsewhere herein.

In a first aspect, the indication to transmit the dynamic UE parameter adaptation report comprises an indication to periodically or semi-persistently transmit the dynamic UE parameter adaptation report, and transmitting the dynamic UE parameter adaptation report to the BS comprises periodically or semi-persistently transmitting the dynamic UE parameter adaptation report to the BS based at least in part on receiving the indication to periodically or semi-persistently transmit the dynamic UE parameter adaptation report. In a second aspect, alone or in combination with the first aspect, periodically or semi-persistently transmitting the dynamic UE parameter adaptation report comprises periodically or semi-persistently transmitting the dynamic UE parameter adaptation report in at least one of one or more PUCCH resources or one or more grant free PUSCH resources.

In a third aspect, alone or in combination with one or more of the first and second aspects, the indication to transmit the dynamic UE parameter adaptation report comprises a dynamic indication to transmit an aperiodic dynamic UE parameter adaptation report, and transmitting the dynamic UE parameter adaptation report to the BS comprises transmitting the aperiodic dynamic UE parameter adaptation report to the BS based at least in part on receiving the dynamic indication. In a fourth aspect, alone or in combination with one or more of the first through third aspects, the dynamic indication comprises a dynamic UE parameter adaptation DCI communication, a scheduling DCI repurposed to carry the dynamic indication, or a non-scheduling DCI that implicitly indicates the dynamic indication.

In a fifth aspect, alone or in combination with one or more of the first through fourth aspects, transmitting the aperiodic dynamic UE parameter adaptation report comprises transmitting the aperiodic dynamic UE parameter adaptation report in at least one of one or more PUCCH, one or more grant free PUSCH resources, or one or more grant dynamically granted PUSCH resources.

In a sixth aspect, alone or in combination with one or more of the first through fifth aspects, the dynamic UE parameter adaptation report indicates at least one of a dynamic UE parameter adaptation configuration configured at the UE, a dynamic UE parameter adaptation configuration most recently received from the BS, one or more dynamic UE parameter adaptation parameters configured at the UE, a remaining amount of time that the UE is to use a timer-based dynamic UE parameter adaptation parameter, a power headroom report, or a buffer status report.

In a seventh aspect, alone or in combination with one or more of the first through sixth aspects, the one or more dynamic UE parameter adaptation parameters comprise at least one of a BWP switching parameter, a PDCCH monitoring parameter, a PDSCH monitoring parameter, a cross-slot scheduling parameter, a quantity of multiple input multiple output layers parameter, or a secondary cell dormancy parameter.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
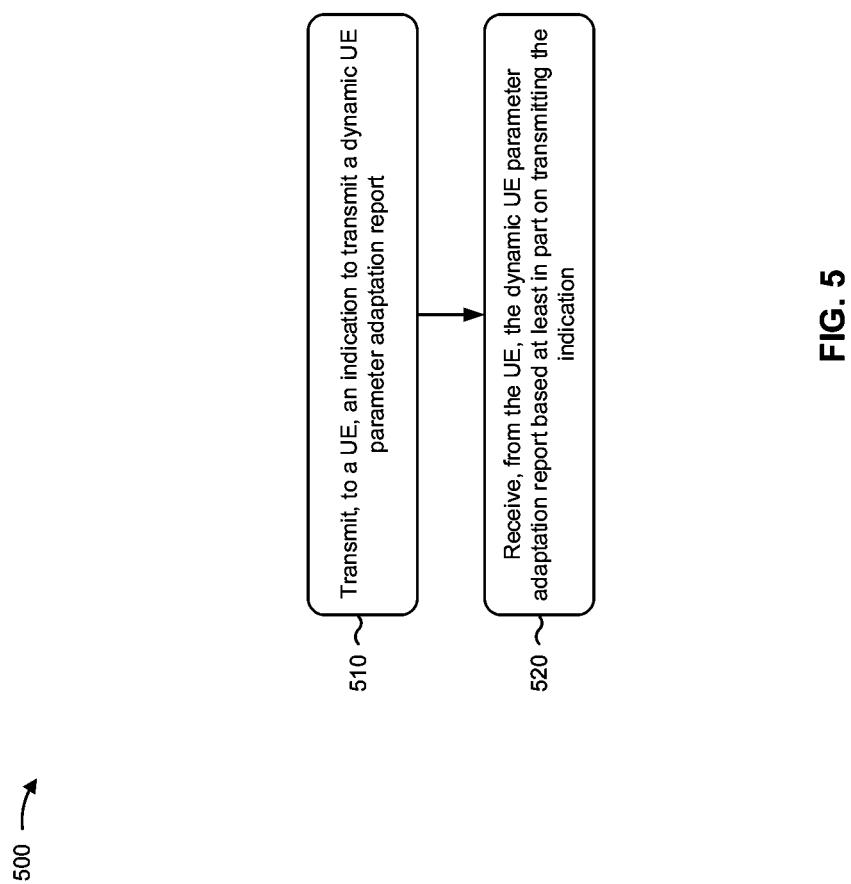
FIG. 5 is a diagram illustrating an example process performed, for example, by a BS, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110) performs operations associated with a dynamic user equipment parameter adaptation status report.

As shown in FIG. 5, in some aspects, process 500 may include transmitting, to a UE, an indication to transmit a dynamic UE parameter adaptation report (block 510). For example, the BS (e.g., using transmit processor 220, receive processor 238, controller/processor 240, memory 242, and/or the like) may transmit, to a UE, an indication to transmit a dynamic UE parameter adaptation report, as described above.

As further shown in FIG. 5, in some aspects, process 500 may include receiving, from the UE, the dynamic UE parameter adaptation report based at least in part on transmitting the indication (block 520). For example, the BS (e.g., using transmit processor 220, receive processor 238, controller/processor 240, memory 242, and/or the like) may receive, from the UE, the dynamic UE parameter adaptation report based at least in part on transmitting the indication, as described above.

Process 500 may include additional aspects, such as any single aspect or any combination of aspects described below and/or in connection with one or more other processes described elsewhere herein.

In a first aspect, the indication to transmit the dynamic UE parameter adaptation report comprises an indication to periodically or semi-persistently transmit the dynamic UE parameter adaptation report, and receiving the dynamic UE parameter adaptation report comprises periodically or semi-persistently receiving the dynamic UE parameter adaptation report based at least in part the indication to periodically or semi-persistently transmit the dynamic UE parameter adaptation report. In a second aspect, alone or in combination with the first aspect, periodically or semi-persistently receiving the dynamic UE parameter adaptation report comprises periodically or semi-persistently receiving the dynamic UE parameter adaptation report in at least one of one or more PUCCH resources or one or more grant free PUSCH resources.

In a third aspect, alone or in combination with one or more of the first and second aspects, the indication to transmit the dynamic UE parameter adaptation report comprises a dynamic indication to transmit an aperiodic dynamic UE parameter adaptation report, and receiving the dynamic UE parameter adaptation report comprises receiving the aperiodic dynamic UE parameter adaptation report based at least in part on the dynamic indication. In a fourth aspect, alone or in combination with one or more of the first through third aspects, the dynamic indication comprises a dynamic UE parameter adaptation DCI communication, a scheduling DCI repurposed to carry the dynamic indication, or a non-scheduling DCI that implicitly indicates the dynamic indication. In a fifth aspect, alone or in combination with one or more of the first through fourth aspects, receiving the aperiodic dynamic UE parameter adaptation report comprises receiving the aperiodic dynamic UE parameter adaptation report in at least one of one or more PUCCH, one or more grant free PUSCH resources, or one or more dynamically granted scheduled PUSCH resources.

In a sixth aspect, alone or in combination with one or more of the first through fifth aspects, the dynamic UE parameter adaptation report indicates at least one of a dynamic UE parameter adaptation configuration configured at the UE, a dynamic UE parameter adaptation configuration most recently received from the BS, one or more dynamic UE parameter adaptation parameters configured at the UE, a remaining amount of time that the UE is to use a timer-based dynamic UE parameter adaptation parameter, a power headroom report, or a buffer status report. In a seventh aspect, alone or in combination with one or more of the first through sixth aspects, the one or more dynamic UE parameter adaptation parameters comprise at least one of a BWP switching parameter, a PDCCH monitoring parameter, a physical downlink shared channel monitoring parameter, a cross-slot scheduling parameter, a quantity of multiple input multiple output layers parameter, or a secondary cell dormancy parameter.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
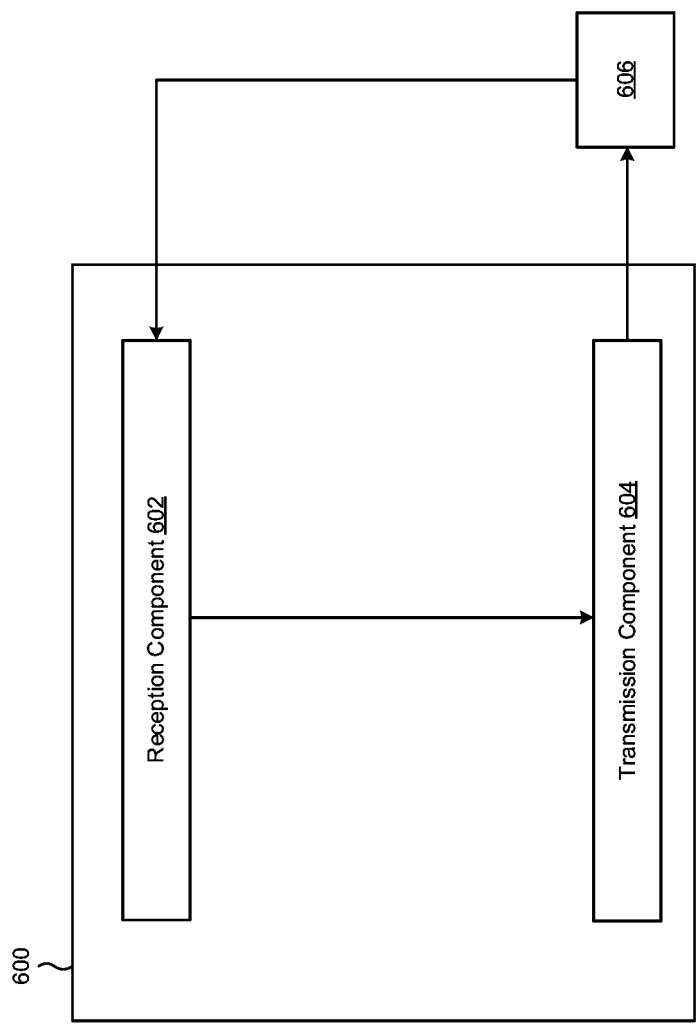
FIGS. 6 and 7 are block diagrams of example apparatuses for wireless communication, in accordance with various aspects of the present disclosure.

FIG. 6 is a block diagram of an example apparatus 600 for wireless communication, in accordance with various aspects of the present disclosure. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604.

In some aspects, the apparatus 600 may be configured to perform one or more operations described herein in connection with FIGS. 3A and 3B. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be co-located with the reception component 602 in a transceiver.

The reception component 602 may receive (e.g., from the apparatus 606) an indication to transmit a dynamic UE parameter adaptation report to the apparatus 606. The transmission component 604 may transmit the dynamic UE parameter adaptation report to the apparatus 606 based at least in part on receiving the indication.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
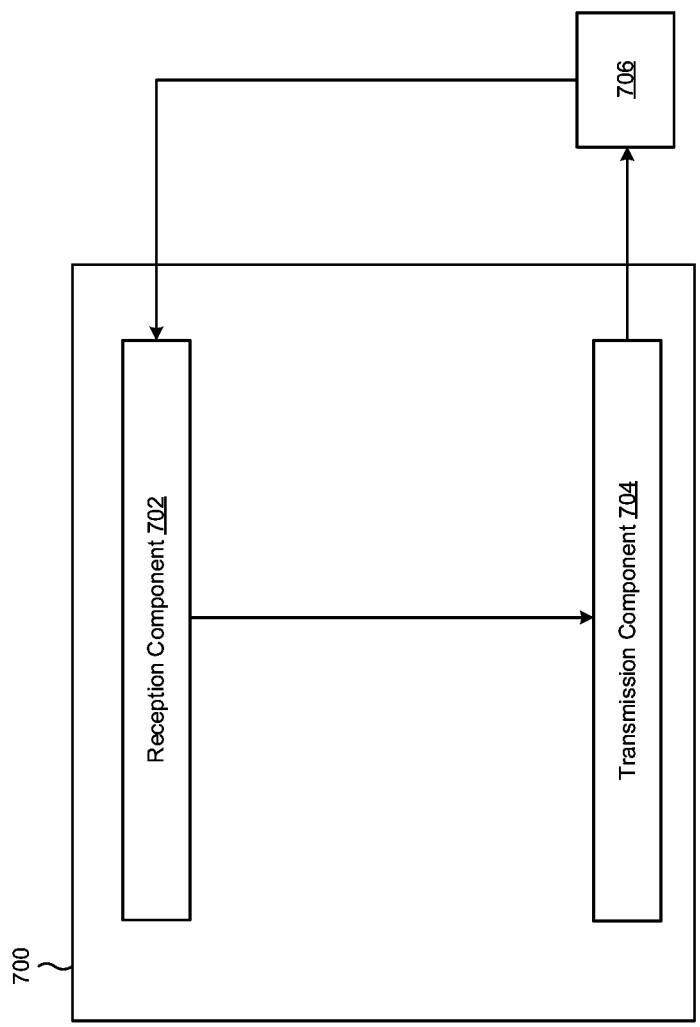

FIG. 7 is a block diagram of an example apparatus 700 for wireless communication, in accordance with various aspects of the present disclosure. The apparatus 700 may be a BS, or a BS may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIGS. 3A and 3B. Additionally, or alternatively, the apparatus 700 may be configured to perform one or more processes described herein, such as process 500 of FIG. 5. In some aspects, the apparatus 700 and/or one or more components shown in FIG. 7 may include one or more components of the BS described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the BS described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the BS described above in connection with FIG. 2. In some aspects, the transmission component 704 may be co-located with the reception component 702 in a transceiver.

The transmission component 704 may transmit, to the apparatus 706, an indication to transmit a dynamic UE parameter adaptation report. The reception component 702 may receive, from the apparatus 706, the dynamic UE parameter adaptation report based at least in part on transmitting the indication.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication to transmit a dynamic UE parameter adaptation report to a network entity, wherein the dynamic UE parameter adaptation report is to include an indication of a dynamic UE parameter adaptation configuration most recently received from the network entity, wherein the dynamic UE parameter adaptation report indicates at least one or more dynamic UE parameter adaptation parameters configured at the UE, wherein the one or more dynamic UE parameter adaptation parameters comprise at least one of: a bandwidth part switching parameter, a physical downlink control channel monitoring parameter, a physical downlink shared channel monitoring parameter, a cross-slot scheduling parameter, a quantity of multiple input multiple output layers parameter, or a secondary cell dormancy parameter; and
   transmitting the dynamic UE parameter adaptation report to the network entity based at least in part on receiving the indication.

2. The method of claim 1, wherein the indication to transmit the dynamic UE parameter adaptation report comprises:
an indication to periodically or semi-persistently transmit the dynamic UE parameter adaptation report; and
wherein transmitting the dynamic UE parameter adaptation report to the network entity comprises:
periodically or semi-persistently transmitting the dynamic UE parameter adaptation report to the network entity based at least in part on receiving the indication to periodically or semi-persistently transmit the dynamic UE parameter adaptation report.

3. The method of claim 2, wherein periodically or semi-persistently transmitting the dynamic UE parameter adaptation report comprises:
periodically or semi-persistently transmitting the dynamic UE parameter adaptation report in at least one of:
one or more physical uplink control channel resources, or
one or more grant free physical uplink shared channel resources.

4. The method of claim 1, wherein the indication to transmit the dynamic UE parameter adaptation report comprises:
a dynamic indication to transmit an aperiodic dynamic UE parameter adaptation report; and
wherein transmitting the dynamic UE parameter adaptation report to the network entity comprises:
transmitting the aperiodic dynamic UE parameter adaptation report to the network entity based at least in part on receiving the dynamic indication.

5. The method of claim 4, wherein the dynamic indication comprises:
a dynamic UE parameter adaptation downlink control information (DCI) communication,
a scheduling DCI repurposed to carry the dynamic indication, or
a non-scheduling DCI that implicitly indicates the dynamic indication.

6. The method of claim 5, wherein transmitting the aperiodic dynamic UE parameter adaptation report comprises:
transmitting the aperiodic dynamic UE parameter adaptation report in at least one of:
one or more physical uplink control channel (PUCCH) resources,
one or more grant free physical uplink shared channel (PUSCH) resources, or
one or more dynamically granted PUSCH resources.

7. The method of claim 1, wherein the dynamic UE parameter adaptation report further indicates at least one of:
a remaining amount of time that the UE is to use a timer-based dynamic UE parameter adaptation parameter,
a power headroom report, or
a buffer status report.

8. A method of wireless communication performed by a network entity, comprising:
transmitting, to a user equipment (UE), an indication to transmit a dynamic UE parameter adaptation report, wherein the dynamic UE parameter adaptation report is to include an indication of a dynamic UE parameter adaptation configuration most recently received from the network entity, wherein the dynamic UE parameter adaptation report indicates at least one or more dynamic UE parameter adaptation parameters configured at the UE, wherein the one or more dynamic UE parameter adaptation parameters comprise at least one of: a bandwidth part switching parameter, a physical downlink control channel monitoring parameter, a physical downlink shared channel monitoring parameter, a cross-slot scheduling parameter, a quantity of multiple input multiple output layers parameter, or a secondary cell dormancy parameter; and
receiving, from the UE, the dynamic UE parameter adaptation report based at least in part on transmitting the indication.

9. The method of claim 8, wherein the indication to transmit the dynamic UE parameter adaptation report comprises:
an indication to periodically or semi-persistently transmit the dynamic UE parameter adaptation report; and
wherein receiving the dynamic UE parameter adaptation report comprises:
periodically or semi-persistently receiving the dynamic UE parameter adaptation report based at least in part the indication to periodically or semi-persistently transmit the dynamic UE parameter adaptation report.

10. The method of claim 9, wherein periodically or semi-persistently receiving the dynamic UE parameter adaptation report comprises:
periodically or semi-persistently receiving the dynamic UE parameter adaptation report in at least one of:
one or more physical uplink control channel resources, or
one or more grant free physical uplink shared channel resources.

11. The method of claim 8, wherein the indication to transmit the dynamic UE parameter adaptation report comprises:
a dynamic indication to transmit an aperiodic dynamic UE parameter adaptation report; and
wherein receiving the dynamic UE parameter adaptation report comprises:
receiving the aperiodic dynamic UE parameter adaptation report based at least in part on the dynamic indication.

12. The method of claim 11, wherein the dynamic indication comprises:
a dynamic UE parameter adaptation downlink control information (DCI) communication,
a scheduling DCI repurposed to carry the dynamic indication, or
a non-scheduling DCI that implicitly indicates the dynamic indication.

13. The method of claim 12, wherein receiving the aperiodic dynamic UE parameter adaptation report comprises:
receiving the aperiodic dynamic UE parameter adaptation report in at least one of:
one or more physical uplink control channel resources (PUCCH),
one or more grant free physical uplink shared channel (PUSCH) resources, or
one or more dynamically granted scheduled PUSCH resources.

14. The method of claim 8, wherein the dynamic UE parameter adaptation report further indicates at least one of:
a remaining amount of time that the UE is to use a timer-based dynamic UE parameter adaptation parameter,
a power headroom report, or
a buffer status report.

15. A user equipment (UE) for wireless communication, comprising:
- a memory; and
- one or more processors coupled to the memory, the one or more processors configured to:
  - receive an indication to transmit a dynamic UE parameter adaptation report to a network entity, wherein the dynamic UE parameter adaptation report is to include an indication of a dynamic UE parameter adaptation configuration most recently received from the network entity, wherein the dynamic UE parameter adaptation report indicates at least one or more dynamic UE parameter adaptation parameters configured at the UE, wherein the one or more dynamic UE parameter adaptation parameters comprise at least one of: a bandwidth part switching parameter, a physical downlink control channel monitoring parameter, a physical downlink shared channel monitoring parameter, a cross-slot scheduling parameter, a quantity of multiple input multiple output layers parameter, or a secondary cell dormancy parameter; and
  - transmit the dynamic UE parameter adaptation report to the network entity based at least in part on receiving the indication.

16. The UE of claim 15, wherein the indication to transmit the dynamic UE parameter adaptation report comprises:
- an indication to periodically or semi-persistently transmit the dynamic UE parameter adaptation report; and
- wherein the one or more processors, when transmitting the dynamic UE parameter adaptation report to the network entity, are configured to:
  - periodically or semi-persistently transmit the dynamic UE parameter adaptation report to the network entity based at least in part on receiving the indication to periodically or semi-persistently transmit the dynamic UE parameter adaptation report.

17. The UE of claim 16, wherein the one or more processors, when periodically or semi-persistently transmitting the dynamic UE parameter adaptation report, are configured to:
- periodically or semi-persistently transmit the dynamic UE parameter adaptation report in at least one of:
  - one or more physical uplink control channel resources, or
  - one or more grant free physical uplink shared channel resources.

18. The UE of claim 15, wherein the indication to transmit the dynamic UE parameter adaptation report comprises:
- a dynamic indication to transmit an aperiodic dynamic UE parameter adaptation report; and
- wherein the one or more processors, when transmitting the dynamic UE parameter adaptation report to the network entity, are configured to:
  - transmit the aperiodic dynamic UE parameter adaptation report to the network entity based at least in part on receiving the dynamic indication.

19. The UE of claim 18, wherein the dynamic indication comprises:
- a dynamic UE parameter adaptation downlink control information (DCI) communication,
- a scheduling DCI repurposed to carry the dynamic indication, or
- a non-scheduling DCI that implicitly indicates the dynamic indication.

20. The UE of claim 19, wherein the one or more processors, when transmitting the aperiodic dynamic UE parameter adaptation report, are configured to:
- transmit the aperiodic dynamic UE parameter adaptation report in at least one of:
  - one or more physical uplink control channel (PUCCH) resources,
  - one or more grant free physical uplink shared channel (PUSCH) resources, or
  - one or more dynamically granted PUSCH resources.

21. The UE of claim 15, wherein the dynamic UE parameter adaptation report further indicates at least one of:
- a remaining amount of time that the UE is to use a timer-based dynamic UE parameter adaptation parameter,
- a power headroom report, or
- a buffer status report.

22. A network entity for wireless communication, comprising:
- a memory; and
- one or more processors coupled to the memory, the one or more processors configured to:
  - transmit, to a user equipment (UE), an indication to transmit a dynamic UE parameter adaptation report, wherein the dynamic UE parameter adaptation report is to include an indication of a dynamic UE parameter adaptation configuration most recently received from the network entity, wherein the dynamic UE parameter adaptation report indicates at least one or more dynamic UE parameter adaptation parameters configured at the UE, wherein the one or more dynamic UE parameter adaptation parameters comprise at least one of: a bandwidth part switching parameter, a physical downlink control channel monitoring parameter, a physical downlink shared channel monitoring parameter, a cross-slot scheduling parameter, a quantity of multiple input multiple output layers parameter, or a secondary cell dormancy parameter; and
  - receive, from the UE, the dynamic UE parameter adaptation report based at least in part on transmitting the indication.

23. The network entity of claim 22, wherein the indication to transmit the dynamic UE parameter adaptation report comprises:
- an indication to periodically or semi-persistently transmit the dynamic UE parameter adaptation report; and
- wherein the one or more processors, when receiving the dynamic UE parameter adaptation report, are configured to:
  - periodically or semi-persistently receive the dynamic UE parameter adaptation report based at least in part the indication to periodically or semi-persistently transmit the dynamic UE parameter adaptation report.

24. The network entity of claim 23, wherein the one or more processors, when periodically or semi-persistently receiving the dynamic UE parameter adaptation report, are configured to:
- periodically or semi-persistently receive the dynamic UE parameter adaptation report in at least one of:
  - one or more physical uplink control channel resources, or
  - one or more grant free physical uplink shared channel resources.

25. The network entity of claim 22, wherein the indication to transmit the dynamic UE parameter adaptation report comprises:
- a dynamic indication to transmit an aperiodic dynamic UE parameter adaptation report; and
- wherein the one or more processors, when receiving the dynamic UE parameter adaptation report, are configured to:
  - receive the aperiodic dynamic UE parameter adaptation report based at least in part on the dynamic indication.

26. The network entity of claim 25, wherein the dynamic indication comprises:
- a dynamic UE parameter adaptation downlink control information (DCI) communication,
- a scheduling DCI repurposed to carry the dynamic indication, or
- a non-scheduling DCI that implicitly indicates the dynamic indication.

27. The network entity of claim 26, wherein the one or more processors, when receiving the aperiodic dynamic UE parameter adaptation report, are configured to:
- receive the aperiodic dynamic UE parameter adaptation report in at least one of:
  - one or more physical uplink control channel resources (PUCCH),
  - one or more grant free physical uplink shared channel (PUSCH) resources, or
  - one or more dynamically granted scheduled PUSCH resources.

* * * * *